United States Patent
Portnoy et al.

(10) Patent No.: US 9,684,723 B2
(45) Date of Patent: Jun. 20, 2017

(54) ADAPTABLE REAL-TIME FEED FOR SITE POPULATION

(71) Applicant: Microsoft Corporation, Redmond, WA (US)

(72) Inventors: William L. Portnoy, Woodinville, WA (US); James Lewallen, Fall City, WA (US); Richard Zaragoza, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 263 days.

(21) Appl. No.: 13/914,065

(22) Filed: Jun. 10, 2013

(65) Prior Publication Data

US 2014/0365460 A1 Dec. 11, 2014

(51) Int. Cl.
*G06F 17/30* (2006.01)

(52) U.S. Cl.
CPC .... *G06F 17/30867* (2013.01); *G06F 17/3089* (2013.01)

(58) Field of Classification Search
CPC .............. G06F 17/30864; G06F 17/30867
USPC ........................................................ 707/710
See application file for complete search history.

(56) References Cited

U.S. PATENT DOCUMENTS

| | | | | |
|---|---|---|---|---|
| 8,386,728 B1 * | 2/2013 | Ionescu | ............ | G06F 17/30864 711/158 |
| 8,438,165 B2 * | 5/2013 | Ickman | ............ | G06F 17/30867 707/713 |
| 2007/0050175 A1 * | 3/2007 | Schmelzer | .......... | G06F 17/3089 702/186 |
| 2007/0214097 A1 * | 9/2007 | Parsons | ............. | G06F 17/30864 706/12 |
| 2009/0319484 A1 * | 12/2009 | Golbandi et al. | .................. | 707/3 |
| 2010/0076937 A1 * | 3/2010 | Abdelnur | ............ | G06F 17/3089 707/679 |
| 2011/0172705 A1 * | 7/2011 | Hadba | .............. | A61B 17/06166 606/219 |
| 2011/0173180 A1 * | 7/2011 | Gurumurthy et al. | ........ | 707/711 |
| 2011/0178940 A1 * | 7/2011 | Kelly | .................. | G06Q 10/1053 705/321 |
| 2011/0258233 A1 * | 10/2011 | Unger | ............... | G06F 17/30457 707/783 |

(Continued)

OTHER PUBLICATIONS

"International Search Report & Written Opinion Issued in PCT Patent Application No. PCT/US2014/039614", Mailed Date: Sep. 5, 2014, 8 Pages.

*Primary Examiner* — James Trujillo
*Assistant Examiner* — Jessica N Le

(57) ABSTRACT

Aspects of the subject disclosure are directed towards increasing a community of interest group users of an interest group, e.g., a network site having a feed of posts generally related to a particular topic. Many newly created interest groups do not have enough content to keep users interested and attract new users. The technology described herein automatically obtains content that backfills such an interest group with additional related content. The backfilled content may be found by keywords search and/or by crawling general public data, data from specific sites, historical conversation data, and/or more widely scoped data. Also described is creating a new interest group and seeding the group with content based upon backfilling technology.

20 Claims, 7 Drawing Sheets

(56) References Cited

U.S. PATENT DOCUMENTS

| | | | |
|---|---|---|---|
| 2012/0005224 A1* | 1/2012 | Ahrens | G06Q 10/10 707/769 |
| 2012/0102063 A1* | 4/2012 | Kemp | G06F 17/3051 707/769 |
| 2012/0102114 A1* | 4/2012 | Dunn | G06Q 10/10 709/204 |
| 2012/0209850 A1* | 8/2012 | Kikin-Gil | G06F 17/30696 707/738 |
| 2012/0233009 A1* | 9/2012 | Fougner | G06Q 50/01 705/26.3 |
| 2013/0088484 A1* | 4/2013 | Marra | G06Q 50/01 345/418 |
| 2013/0097186 A1* | 4/2013 | van Hoff | G06F 17/3064 707/749 |
| 2013/0325660 A1* | 12/2013 | Callaway | G06Q 30/0609 705/26.35 |
| 2014/0195930 A1* | 7/2014 | Rajagopal | G06F 3/0484 715/753 |
| 2015/0149282 A1* | 5/2015 | Wolfe | G06Q 50/01 705/14.55 |

\* cited by examiner

ADAPTABLE REAL-TIME FEED FOR SITE POPULATION

BACKGROUND

Many websites provide continual updates in a "news feed" format, in which the latest or most interesting information appears at the top. Such sites build a community by adding social features such as "likes" or "comments."

In many instances, the flow of items in a news feed increases to the point where there is too much information, and users are overwhelmed. Structure may be added from this point, usually in the form of tags or hierarchical posting groups. This leads to another type of website, comprising an "interest network," where users can follow more narrow topics of personal interest, usually curated by sets of other interested and motivated users.

Interest networks that are newly created seek to emulate larger, more established sites, by trying to create and maintain their own community of users. To do this, interest networks are challenged with providing enough content to keep users engaged; as more networks and topic are created, the challenge intensifies as domains of interest become increasingly narrow, and as many other sites arise that are also competing for users. For example, a user may have a strong interest in some aspect of mobile technology, but his or her attention cannot be maintained on a given site if there is no community around that interest to generate enough compelling content. The problem is thus not having too much content, but rather not enough content to keep users interested enough to grow more interest and increase the community.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter Briefly, various aspects of the subject matter described herein are directed towards backfilling interest group content with at least some selected content that is selected based upon being related to the interest group. A backfill mechanism may be configured to select content related to an interest group, and process the content for including with other interest group content.

One or more aspects are directed towards backfilling an interest group with additional content, in which the interest group corresponds to content related to a topic of interest, including obtaining selected content by requesting at least one of: a keyword-based search, a general crawl, a directed crawl, a historical crawl, or a hierarchical crawl, and adding additional content corresponding to at least some of the selected content. Also described herein is creating an interest group based upon example data, including backfilling the created interest group by seeding the interest group with the additional content.

Other aspects and advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards encouraging visitors to interest groups (e.g., containing content feeds of particular interests) to participate in an interest group, including contributing content to the interest group. To this end, a sparsely populated interest group and/or which is otherwise "slow" (infrequently updated) is automatically backfilled with content selected for that interest group. This removes the sparseness and provides new relevant content (not necessarily new in time, but not previously presented) to capture and retain a visitor's attention, and thereby encourages visitors to visit often and hopefully participate.

In one or more aspects, the backfilling of an existing interest group may be based upon public data, historical data such as previous conversations, and/or hierarchical categories (e.g., content with a large scope relative to the narrower scope of the interest group). Also described is the creation of a new interest group seeded by content, e.g., based upon a single example post or small number thereof. Once seeded, the interest group content may use the seeded content as "existing" content that is a basis for subsequent backfill operations.

It should be understood that any of the examples herein are non-limiting. As such, the present invention is not limited to any particular embodiments, aspects, concepts, structures, functionalities or examples described herein. For instance, many of the examples refer to an interest group/feed of posts, however it is understood that a website or part thereof may be populated with content that is not necessarily feed-type content. Rather, any of the embodiments, aspects, concepts, structures, functionalities or examples described herein are non-limiting, and the present invention may be used various ways that provide benefits and advantages in computing, networking and providing content in general.

Figure 1:
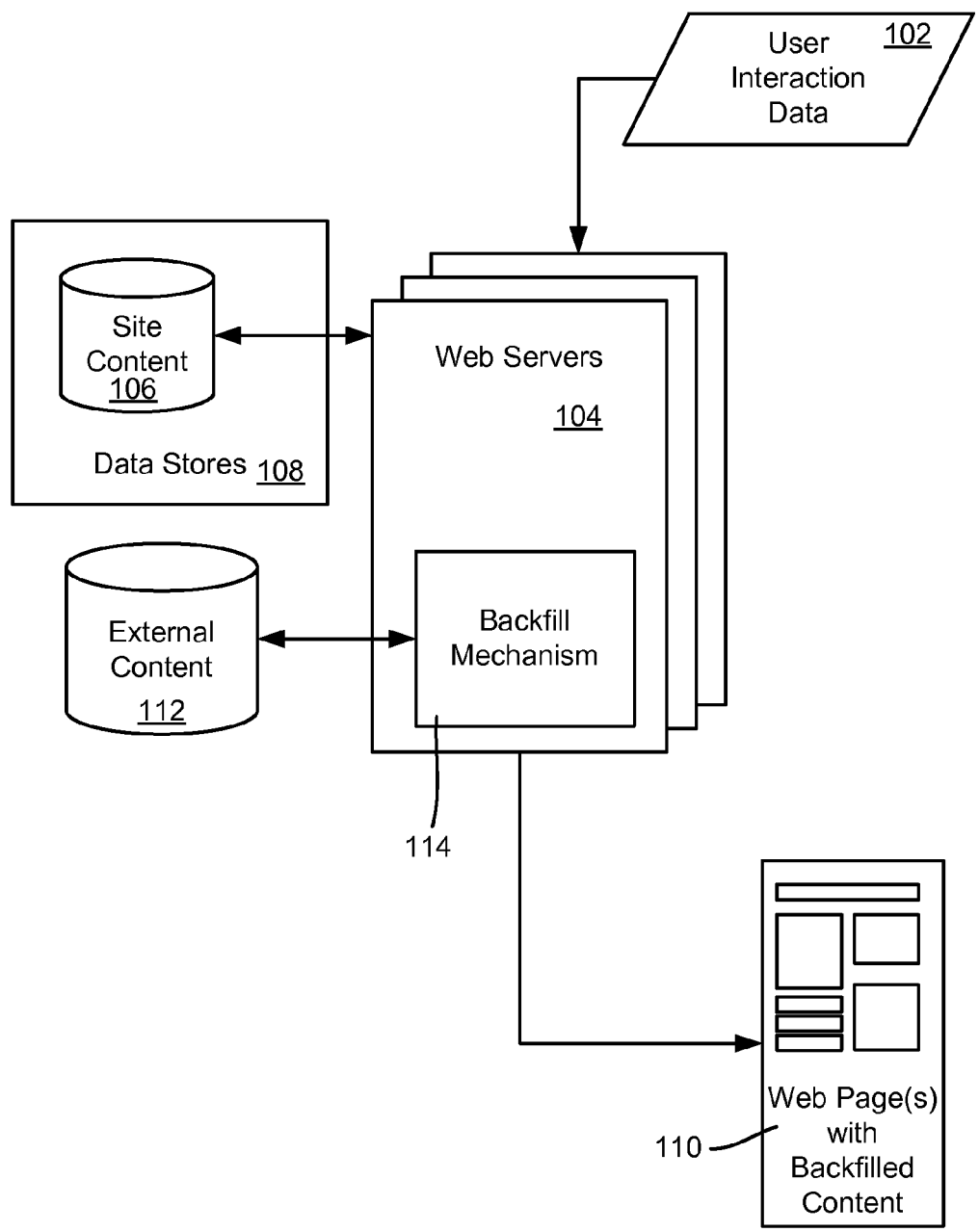
FIG. 1 is a block diagram representing example components for backfilling interest group content with additional content, according to one or more example implementations.

FIG. 1 is a block diagram showing example components by which content from external sources may be located and used to backfill a site or section/topic therein. In general, before backfilling many "interest groups" (e.g., each comprising a particular feed) may be otherwise sparse. Users interact with such interest groups, but tend to only briefly interact and not participate unless the interest group is interesting to the user.

Thus, in general, a user interacts (block 102) with a set of web servers 104 to view and possibly upload content selected from the site's available content 106 in a data store 108. As one example, a user who is interested in viewing and possibly contributing to an interest group receives an interactive web page 110 (or set of pages) containing existing content, e.g., a feed of posts, articles and/or comments arranged in a timeline, along with one or more input mechanisms (or links thereto) for contributing additional content. For example, the existing content may be arranged as a plurality of posts, arranged in time order, through which the user can scroll. A user may click on an interactive element on the page and be provided with an input mechanism to add a post, or taken to another page having such an input mechanism. The input mechanism may assist the user, e.g., provide a way for the user to search for images to post, and provide a text editor to allow typing content and/or copying in content, including words and URLs, and so forth.

As described herein, the interest group may initially have a sparse amount of user-contributed content, e.g., as little as a single post. A new or occasional visitor may locate the interest group because of its topic of interest, and thus interacts to see a latest instance of the web page 110. However, as described above, if there is not much content to capture the new user's interest, the new user is likely to leave the interest group without contributing any content, and is also less likely to visit the interest group again. As can be readily appreciated, the creator or creators of the interest group, e.g., the one who first posted content, can only contribute so much, and heretofore had to rely on the community to contribute more content to the interest.

Described herein is backfilling interest group content (e.g., a feed) with content from one or more external data sources 112 so that an otherwise sparse interest group has sufficient content to keep users interested in the interest group. The backfilling may take place regularly, e.g., daily, so that the content is not the same over time. As described herein, a backfill mechanism 114 may use any of one or more various external sources and information retrieval technologies to obtain such external content. For example, backfilled content may be in the form of automatically generated posts with various images and/or text, possibly including URLs obtained from external sources. The content in the backfilled posts may correspond to (e.g., copied and/or derived from) other posts, general informational websites, email messages that have been made public, and so on as described herein.

Figure 2:
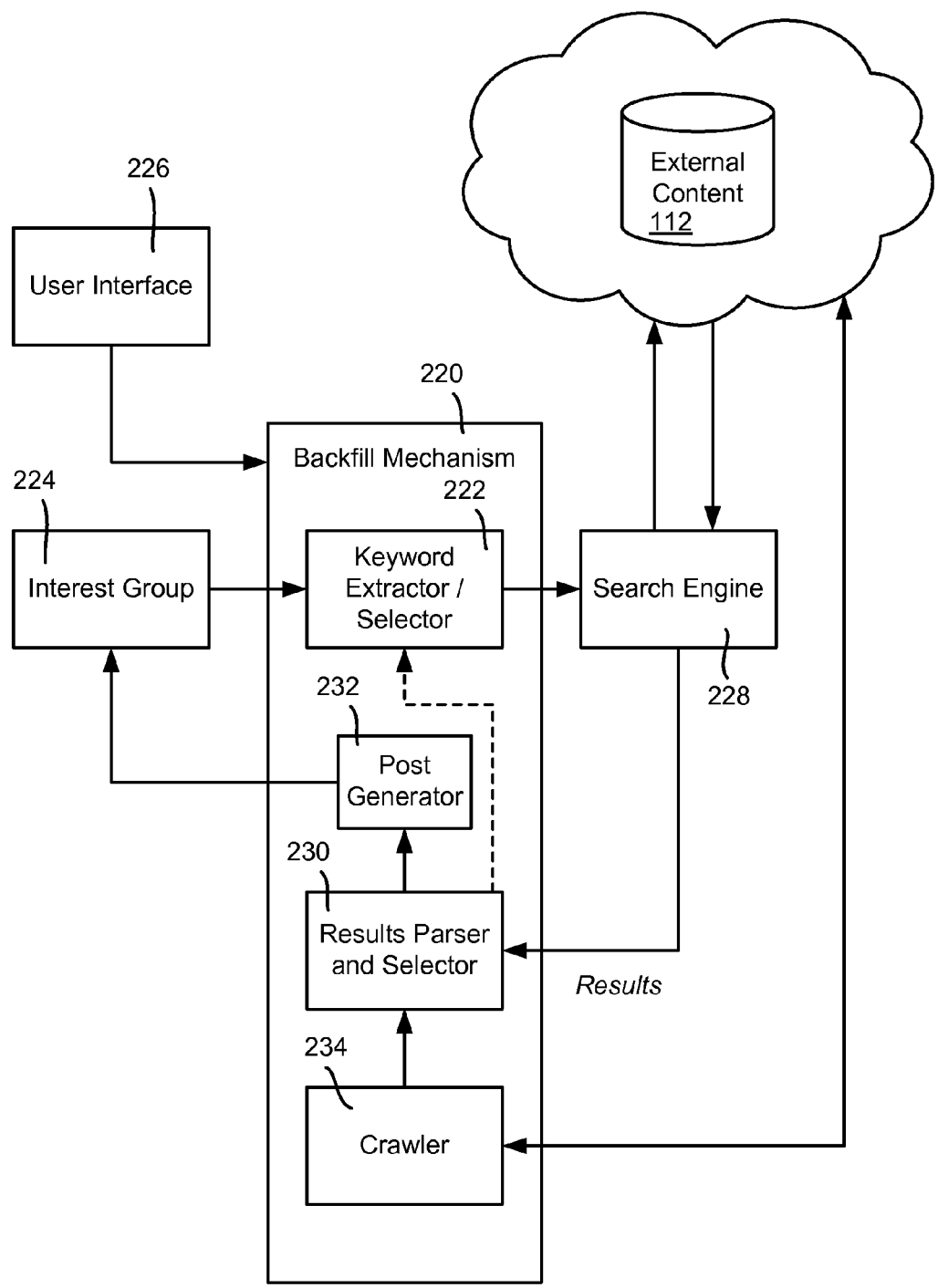
FIG. 2 is a block diagram representing components associated with a backfill mechanism that is configured to backfill an interest group, according to one or more example implementations.

One way to backfill an existing interest group is with public data. Such data may be searched by keywords (a keyword may be a single term or more than one term) extracted from the existing interest group, such as words that appear in the post or posts available, a "title" of the interest group, and so on. This is generally represented in FIG. 2, where a backfill mechanism 220 is associated with (e.g., incorporates or is coupled to) a keyword extractor 222 that selects keywords from an interest group 224, e.g., possibly employing well-known frequency counting techniques, stopword filtering techniques, and so on, for example. Synonyms also may be used to add to the keywords, as can manual input by a user or set of users, e.g., via a user interface 226 (which may be limited to the interest group's creator and the hosting site). For example, a user who creates the interest group and invokes the backfill mechanism 220 to populate it with content may provide information (e.g., one or more keywords) to the backfill mechanism 220; this information may be weighted more heavily than automatically extracted keywords, for example. Note that the backfill mechanism may be invoked without user participation, e.g., by default an interest group with less than some amount of posts, which may be recent posts, may automatically backfill the interest group to achieve a desired level.

The keywords that are selected may be provided to a search engine 228 in one or more queries to retrieve one or more sets of ranked documents as search results. These results may be parsed and processed to determine a consistent theme or the like among the retrieved documents, from which content may be selected; this is represented in FIG. 2 by the results parser and selector 230. Additional keywords may be extracted from the retrieved documents and used to obtain more documents in a secondary search, and so on. Note that a user may use a single item (or some selected subset of items) from a backfilled feed to filter system content and see a new feed of similar or like content to that single item or subset. Posts (or other arrangements) of the selected backfill content are generated by a post generator 232 or the like, and backfilled into the interest group.

In addition to (or instead of) using a search engine, other ways to obtain content for backfill may be used. For example, FIG. 2 shows a crawler 234 configured to locate possible content to use. This may be based upon a URL that has been discussed, topics of interest, user identity across different sites, current trends related to a topic, newly released information that was previously private, and so on.

Parameters may be provided with respect to the backfill operation. For example, keywords and/or sites to include (a whitelist) and/or exclude (a blacklist) may be provided, as may some time limit, size limit, and so forth. Crawls may be limited to only a certain timeframe. An update schedule may be specified, e.g., backfill once a day. A backfill threshold level may be provided, e.g., backfill up to two hundred new posts. Basically, any variable may be controlled to obtain a desired backfill of content.

Note that with respect to accessing such data, one common permissioning scheme is a binary "allowed to see it" or not scheme, in which a user needs to be a member of a group to have the permissions for an item. However, many types of permissioning schemes are hierarchical, ranging from completely private (e.g. email), to shared with your family (e.g. pregnancy posts), to a wider circle of friends (e.g. future plans to change jobs), to shared with companies (e.g. resumes), to completely public (e.g. online profiles). The backfill mechanism only may obtain completely public data unless a user gives permission data to the backfill mechanism.

Not all feeds may be updated with posts from the general public. For example, a private company feed on a specific narrow topic (e.g. future releases of a popular video game) can be provided to interested readers and limited to certain contributors. Such a feed may be easily supplemented with public sources of information on that same topic to keep the channel fresh (e.g. when a community is anticipating the upcoming next release).

The backfill mechanism 220 may include a crawling mechanism (e.g., within the crawler 234) that looks for the granular release of portions of content previously deemed too sensitive to make public. In other words, the amount of secrecy associated with information changes over time, and crawler acts upon such changes. By way of example, a large amount of information may be kept secret during development of a new consumer product. After the product is released, the secrecy may be lifted, at least to some extent. For example, after a product releases, it is common to also release "making of" and "behind the scenes" videos and previously confidential interviews and evaluations. This newly available information provides an additional source of rich content for bootstrapping a larger community.

Figure 3:
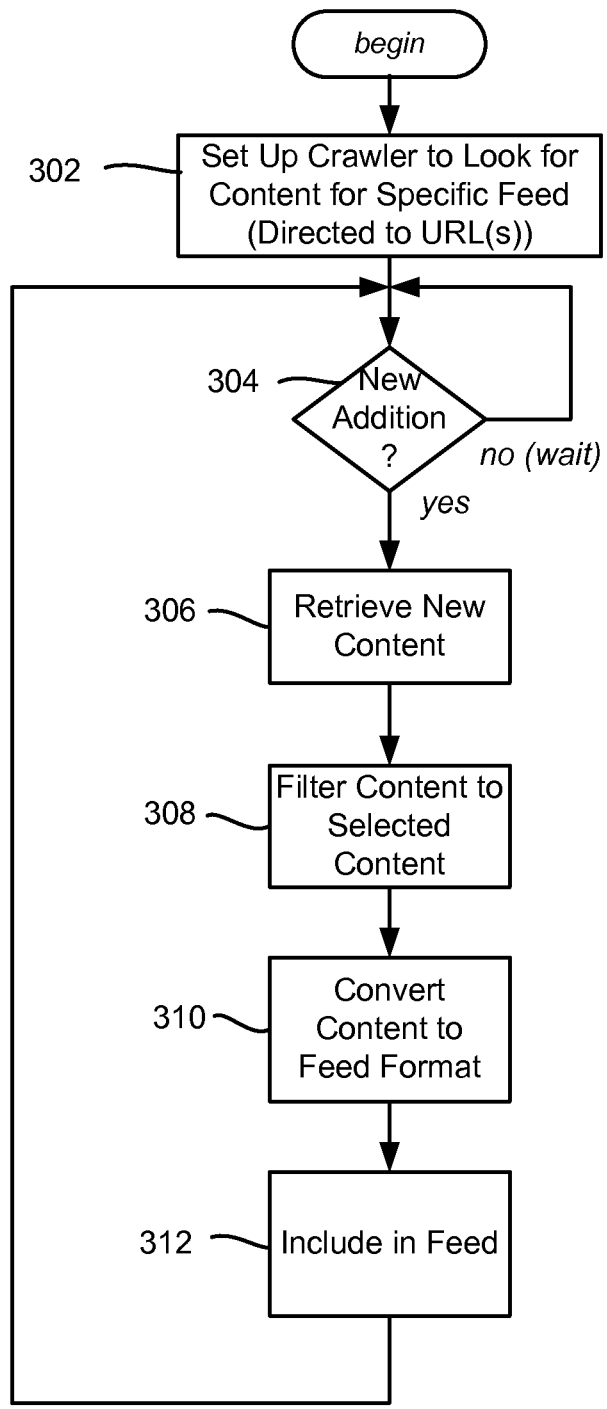
FIG. 3 is a flow diagram representing example steps that may be taken to detect any new content to use in backfilling an interest group, according to one or more example implementations FIGS. 4 and 5 comprise a flow diagram representing example steps that may be taken to obtain and use content for backfilling, according to one or more example implementations.

FIG. 3 represents example logic of one such granular release crawling mechanism, which, for example, may be incorporated into the crawler 234 of FIG. 2. In general, at step 302 an owner or the like of the interest group, e.g., a private company, sets up the crawling mechanism or other such mechanism to watch for newly released content related to a feed to backfill. Parameters may include where to look (e.g., URLs to check), how often to check, what to include or exclude, a granularity level, a time window, and so on.

At step 304, the crawling mechanism wakes up according to a schedule or an event and looks for newly added content at the specified location or locations. If there is none, the crawling mechanism goes back to sleep until the next time or event. Note that the check for new content allows a provider of the content to simply add items to an existing set of items, for example, without caring how those items are used thereafter. For example, a company may wish to declassify some of a product development team's emails to generate publicity regarding a newly released product. These can be placed on a site when ready, for example, for general access.

Step 306 represents retrieving any new content that is found. Step 308 represents filtering the content to that which is relevant for a given topic. By way of example, consider that a narrow topic regarding some unusual feature of a video game may have its own feed. In this example, the filtering selects the specific content for that unusual feature from among the general content that may be made available for the video game. Selection and/or filtering may use external information to determine what content is more likely to be interesting, e.g., ranking among the various content. For example, content may be used as backfill based upon explicit recommendations of users of a social networks, such as likes, dislikes and so forth; a lot of likes and dislikes on the same topic may indicate a controversial topic; this may be good for a particular feed to start up a conversations. Popularity is another possible factor in determining content to backfill, e.g., what is trending in general, what users are selecting when searching (e.g., if search logs are available) and so on.

Note that retrieving the content at step 306 may including the filtering criteria, e.g., retrieve only content for this topic. Alternatively, the backfill mechanism/crawling mechanism can support multiple different feeds by different filtering, whereby step 308 can be performed for any number of topics, e.g., to filter general content to select only content related to feature A for one feed, to filter general content to select only content related to feature B for another feed, and so on.

Filtering may be granular with respect to different levels of released information. For example, a company in charge of both the content release and the backfill mechanism may specify a secrecy level with each piece of released content. The backfill mechanism may be instructed to only retrieve content up to a certain level for a certain feed; this allows content to be placed in one location yet be accessed for different purposes or by different interest groups. For example, an executive/developer interest group may obtain all content, an employee-only interest group may receive some restricted subset of the content, a general public interest group may receive an even more restricted subset of content, and so on. Generated feeds may be kept private to a user (or group) until the user makes it public, essentially creating a public interest group. A user may use a single item (or some selected subset of items) from one feed to filter system content and see a new feed of similar or like content to that single item or subset.

Step 310 represents converting the selected content to a format suitable for the corresponding feed. For example, email content may be released, and may be converted to a "posting" that matches the format of other postings in the interest group. Step 312 includes the posting in the feed.

In another aspect, an existing interest group may be backfilled with historical data. For example, for many web sites, the posts, articles and comments are isolated and self-contained items, created on demand by a user's actions. However, unless the user is an expert or veteran member of the community, his or her contributions are not threaded through the historical record for a community. When a feed has a low rate of posts, a user's contribution goes unrecognized if there are no contemporary users willing to engage with that user.

However, there is value in enhancing the cohesiveness of the longer term contribution of the community. Thus, in one or more implementations, the backfill mechanism 220 may be configured to apply informational retrieval techniques to connect conversations. For example, a user may post a previously discussed URL to the top of the feed to try and start a new conversation regarding that former topic. The crawler 234 of the backfill mechanism 220 may backfill the interest group with previous conversations (or content from previous conversations) related to that URL, which may be from different external sources, including from archives, from historical data on the site that is hosting the interest group, and so forth. Note that in contrast, many popular, well-trafficked social news sites find the resubmission of the same URL tiresome and do their best to prevent it. With a sparse feed, backfilling as described herein uses the resubmission of content around a specific URL to an interest group's benefit, because it allows a point-in-time conversation to spread across longer term asynchronous interactions of many users.

Another aspect is the backfilling of an existing interest group with hierarchical categories. Note that mature web sites have rich and well-defined interest groups and communities. If a new user posts something off-topic to those communities, the user may be chastised for not staying within the charter of a group. In contrast, for a slow feed with sparse content, this is an opportunity to backfill content.

By way of example, if a user has a narrow interest in first-person shooter games on the XBox® 360, there may not consistently be specific and/or interesting new content all of the time. However, it is very likely that there is news related to the XBox® in general, or Windows® gaming, or gaming in general. Such content with a large scope may be transparently mixed into the feed that lacks for enough flow to keep users returning every day, (instead of only encouraging specific content and/or traditional links to specific content).

In another aspect, creation of a new interest group may be seeded by content. For example, when a user comes to a new site looking for content related to his or her interests, the user may choose to browse a directory-style overview of the site or leverage full-text search to find content for their topics of interest. However, smaller sites have heretofore been limited by the amount of content that previous users have contributed or curated for the site, which may be sparse, and many times have no interest group feed that matches a user's interest.

When specific topics do not have an existing feed or community of interest group on a new web site, results from a "search by example" type of input may help create a feed for that user's specific interest. To this end, starting from a single user-supplied example post (or possibly some small number thereof), the system may apply an entity extraction mechanism to find "seed" entities. The backfill mechanism 224 then finds content related to those seeds to form a more complete feed for that topic. Note that the system is not limited to searches based upon keyword matching.

Figure 4:
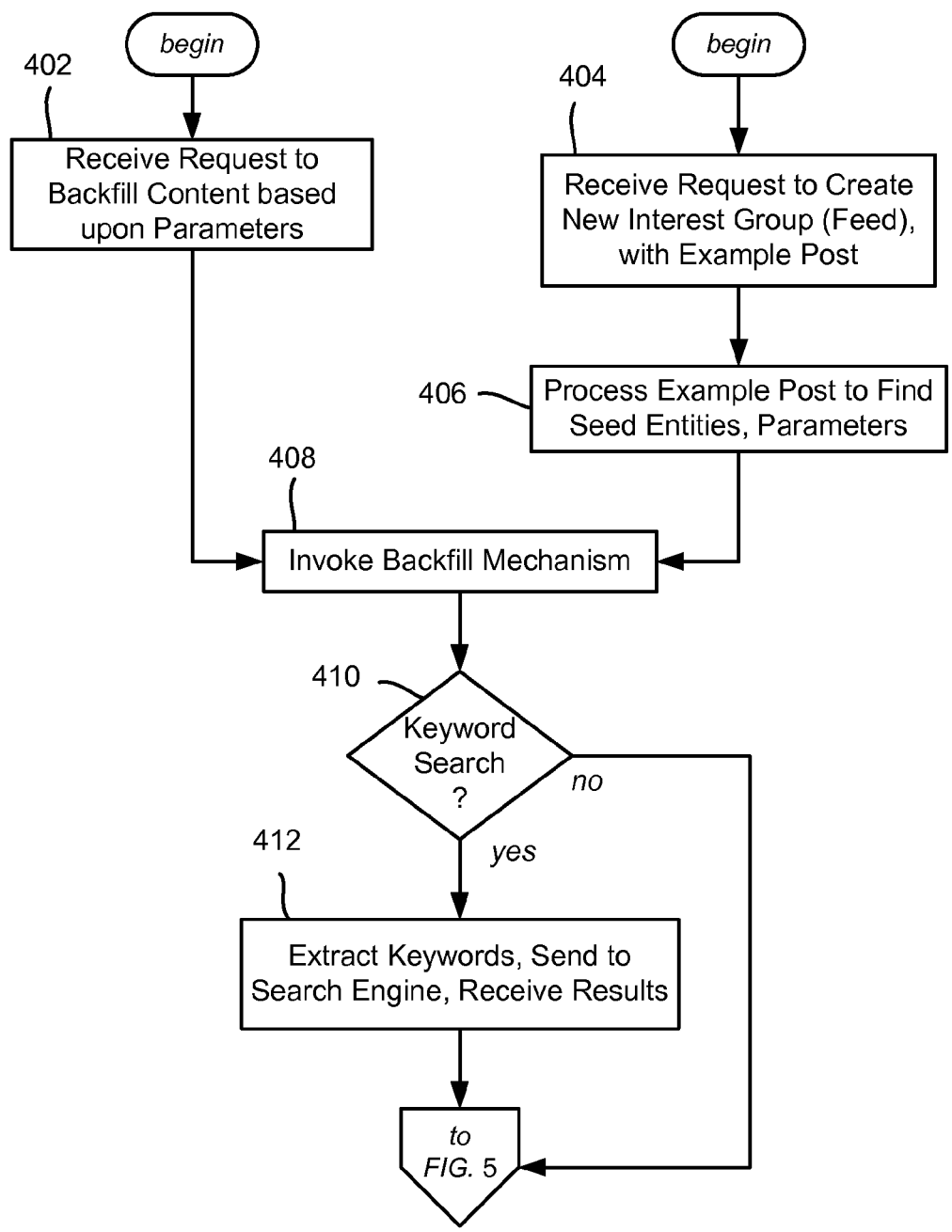
Figure 5:
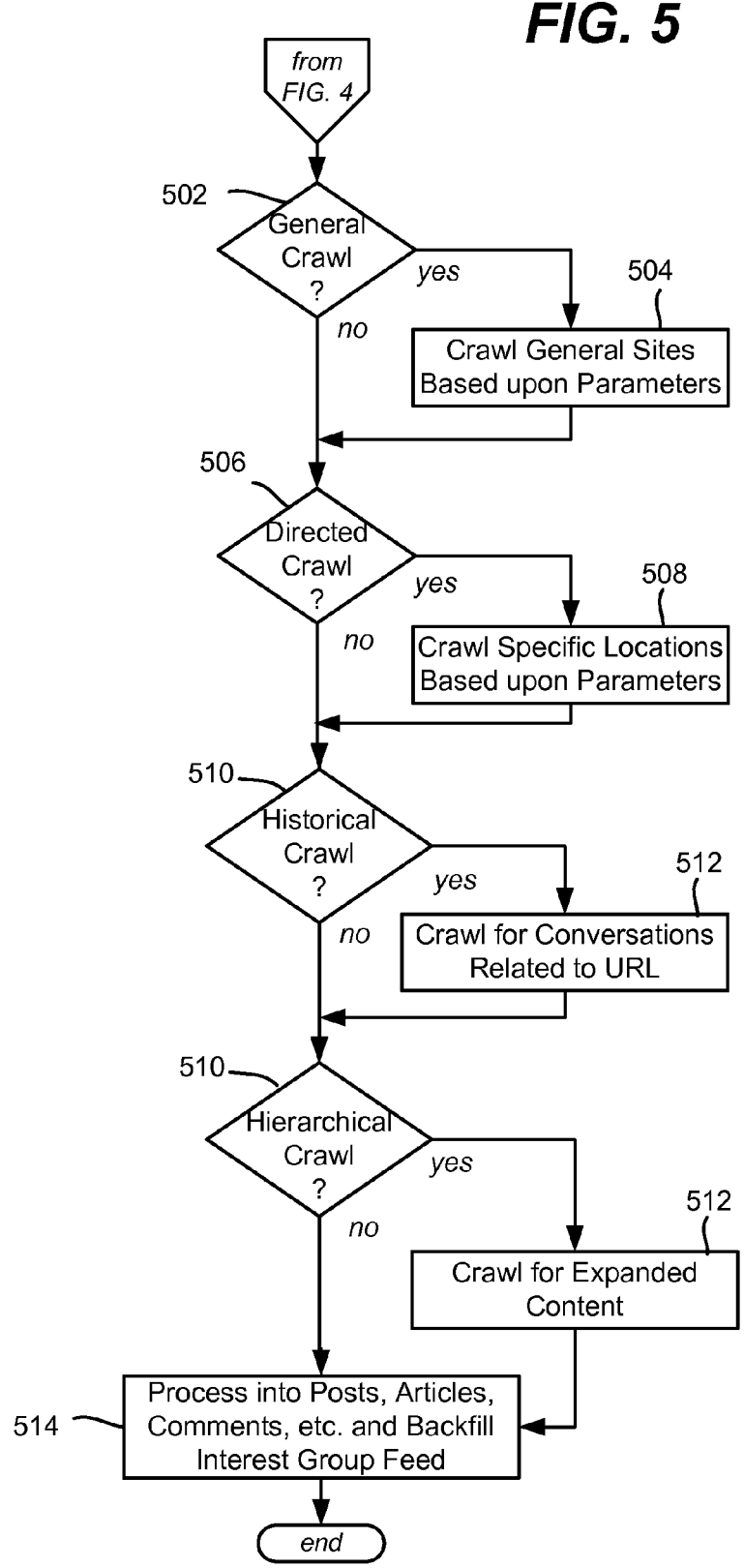

FIGS. 4 and 5 comprise a flow diagram summarizing some of the example concepts set forth above. Step 402 represents receiving a request to backfill existing interest group content, which as described above may include parameters. The request may be scheduled, event driven, and so on. Alternatively, a backfilling operation may be started upon a request for the creation of a new group (step 404) using an example post as a seed (step 406) to locate content. Step 408 represents invoking the backfill mechanism; note that step 406 may be part of the backfill mechanism.

Step 410 represents determining whether a keyword search is to be done, which, for example, may be based upon whether there is to be a search for content and/or a crawl for content. For example, a keyword search may be done for backfilling with general content, or when seeding a newly created interest group, but may not be done when crawling a known site for updates (e.g., declassified information) or when crawling for historical conversations. If a keywords search is to be done, step 412 represents extracting the keywords as needed, sending the keywords to a search engine, and receiving the results.

FIG. 5 is directed towards the crawling aspects of the exemplified backfill mechanism, beginning at step 502 where the need for a general crawl is evaluated. For example, this may be used to look for content of interests related to general public data to backfill a feed or seed a new feed. If so, step 504 performs a crawl of general sites, possibly subject to parameters such as to find only content that is less than a day old.

Step 506 represents whether the backfilling is to include a directed crawl, e.g., one to a predetermined (e.g., company-specified) set of one or more monitored URLs. For example, as described above a company may put information on a site on occasion, which is another possible source of content for an interest group. Step 508 represented such a directed crawl.

Steps 510 and 512 represent the historical crawl, e.g., for previous conversations related to a URL. Steps 510 and 512 represent the hierarchical crawl for an expanded scope of content.

Note that whether a search and/or crawl are performed may be contingent on previous results. As one example, the hierarchical crawl may be done only when there is insufficient backfill content obtained from other crawls.

Step 514 represents processing the collected content into posts, articles, comments and so forth, and backfilling the interest group content with at least some of the additional content. Processing may include filtering, ranking, some random selection of different types of content, from different users, different sources and/or the like. Note that the date of the content may be changed as part of the ranking, e.g., to backfill likely more relevant content above less relevant content in a timeline-ordered presentation, even though the less relevant content actually may have been more recent. Processing also may include formatting content into a suitable or appropriate format for the interest group.

Example Networked And Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 6:
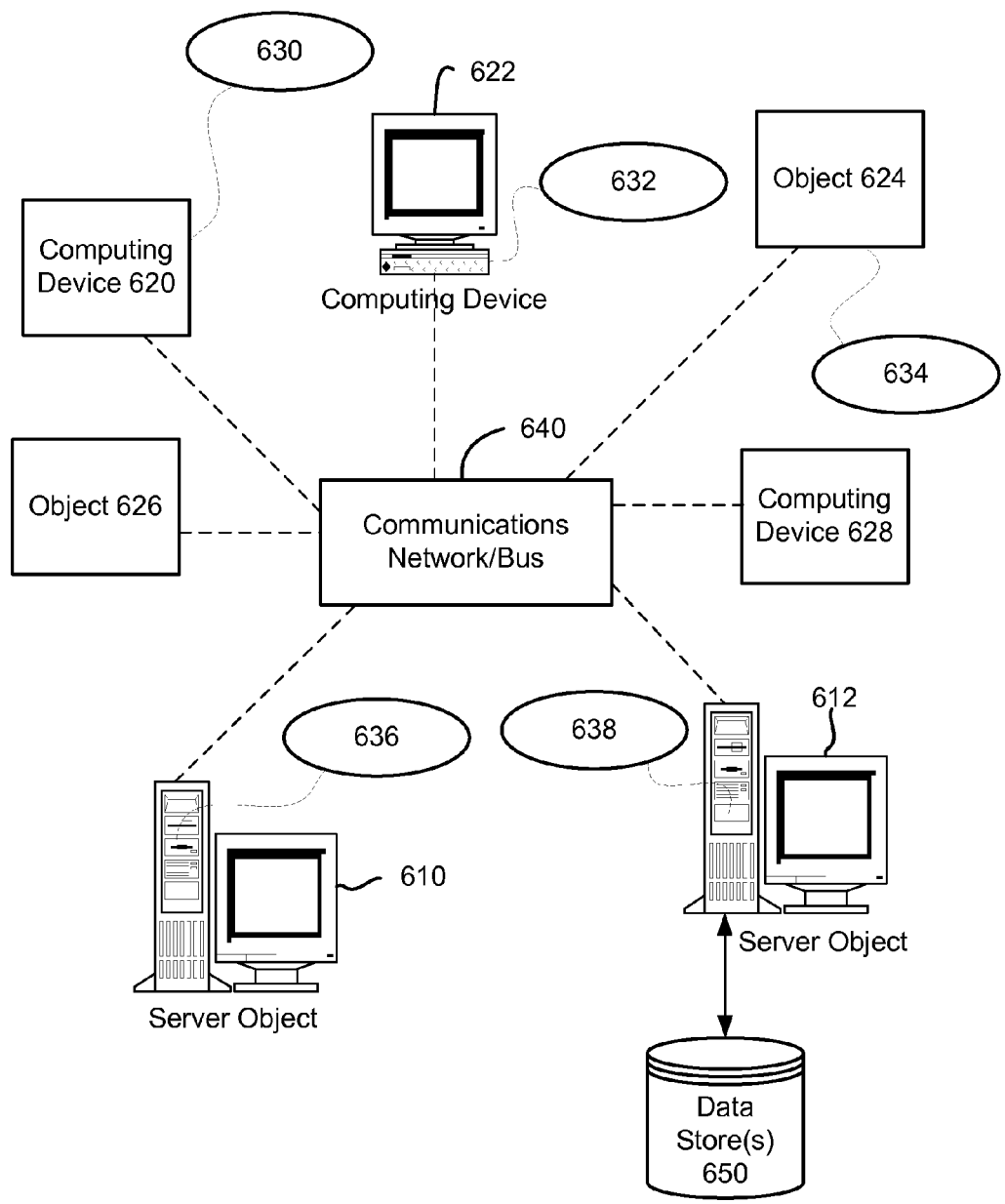
FIG. 6 is a block diagram representing example non-limiting networked environments in which various embodiments described herein can be implemented.

FIG. 6 provides a schematic diagram of an example networked or distributed computing environment. The distributed computing environment comprises computing objects 610, 612, etc., and computing objects or devices 620, 622, 624, 626, 628, etc., which may include programs, methods, data stores, programmable logic, etc. as represented by example applications 630, 632, 634, 636, 638. It can be appreciated that computing objects 610, 612, etc. and computing objects or devices 620, 622, 624, 626, 628, etc. may comprise different devices, such as personal digital assistants (PDAs), audio/video devices, mobile phones, MP3 players, personal computers, laptops, etc.

Each computing object 610, 612, etc. and computing objects or devices 620, 622, 624, 626, 628, etc. can communicate with one or more other computing objects 610, 612, etc. and computing objects or devices 620, 622, 624, 626, 628, etc. by way of the communications network 640, either directly or indirectly. Even though illustrated as a single element in FIG. 6, communications network 640 may comprise other computing objects and computing devices that provide services to the system of FIG. 6, and/or may represent multiple interconnected networks, which are not shown. Each computing object 610, 612, etc. or computing object or device 620, 622, 624, 626, 628, etc. can also contain an application, such as applications 630, 632, 634, 636, 638, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for example communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 6, as a non-limiting example, computing objects or devices 620, 622, 624, 626, 628, etc. can be thought of as clients and computing objects 610, 612, etc. can be thought of as servers where computing objects 610, 612, etc., acting as servers provide data services, such as receiving data from client computing objects or devices 620, 622, 624, 626, 628, etc., storing of data, processing of data, transmitting data to client computing objects or devices 620, 622, 624, 626, 628, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 640 or bus is the Internet, for example, the computing objects 610, 612, etc. can be Web servers with which other computing objects or devices 620, 622, 624, 626, 628, etc. communicate via any of a number of known protocols, such as the hypertext transfer protocol (HTTP). Computing objects 610, 612, etc. acting as servers may also serve as clients, e.g., computing objects or devices 620, 622, 624, 626, 628, etc., as may be characteristic of a distributed computing environment.

Example Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 7 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 7:
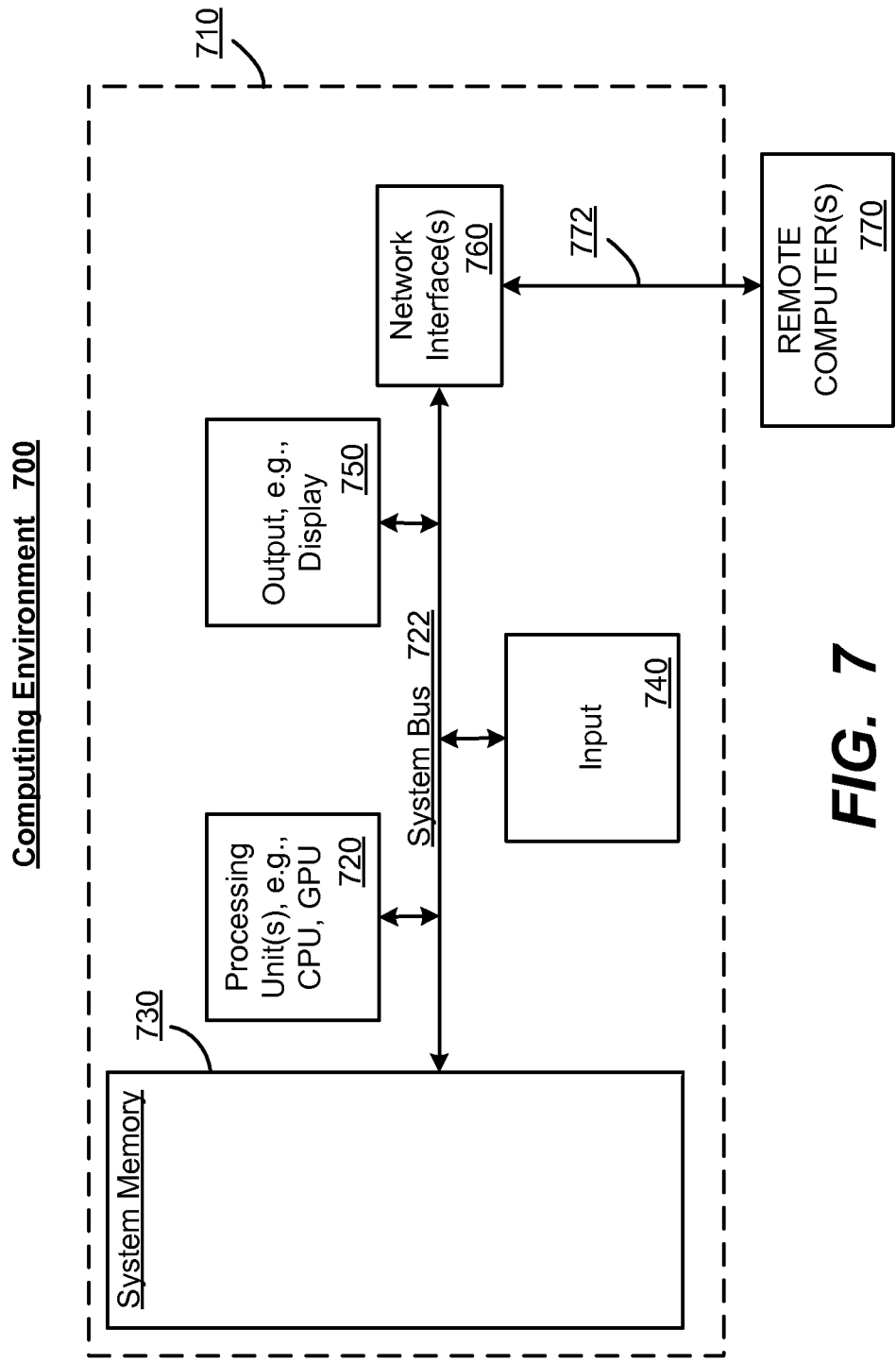
FIG. 7 is a block diagram representing an example non-limiting computing system or operating environment in which one or more aspects of various embodiments described herein can be implemented.

FIG. 7 thus illustrates an example of a suitable computing system environment 700 in which one or aspects of the embodiments described herein can be implemented, although as made clear above, the computing system environment 700 is only one example of a suitable computing environment and is not intended to suggest any limitation as to scope of use or functionality. In addition, the computing system environment 700 is not intended to be interpreted as having any dependency relating to any one or combination of components illustrated in the example computing system environment 700.

With reference to FIG. 7, an example remote device for implementing one or more embodiments includes a general purpose computing device in the form of a computer 710. Components of computer 710 may include, but are not limited to, a processing unit 720, a system memory 730, and a system bus 722 that couples various system components including the system memory to the processing unit 720.

Computer 710 typically includes a variety of computer readable media and can be any available media that can be accessed by computer 710. The system memory 730 may include computer storage media in the form of volatile and/or nonvolatile memory such as read only memory (ROM) and/or random access memory (RAM). By way of example, and not limitation, system memory 730 may also include an operating system, application programs, other program modules, and program data.

A user can enter commands and information into the computer 710 through input devices 740. A monitor or other type of display device is also connected to the system bus 722 via an interface, such as output interface 750. In addition to a monitor, computers can also include other peripheral output devices such as speakers and a printer, which may be connected through output interface 750.

The computer 710 may operate in a networked or distributed environment using logical connections to one or more other remote computers, such as remote computer 770. The remote computer 770 may be a personal computer, a server, a router, a network PC, a peer device or other common network node, or any other remote media consumption or transmission device, and may include any or all of the elements described above relative to the computer 710. The logical connections depicted in FIG. 7 include a network 772, such local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a method performed at least in part on at least one computing device, the method comprising:
    determining, using a crawling mechanism, whether content associated with one or more external data sources has been previously presented at an interest group feed;
    on condition that the content has not been previously presented at the interest group feed, retrieving the content associated with the one or more external data sources;
    selecting, using a backfill mechanism, at least some of the retrieved content;
    associating the selected content with a permissioning scheme that controls access to the selected content, the permissioning scheme including one or more hierarchical permission levels;
    backfilling the interest group feed with at least some of the selected content in accordance with the permissioning scheme, the at least some of the selected content associated with a permission level that corresponds to the permission level associated with the interest group feed;
    receiving example content associated with a topic that does not correspond to an existing interest group feed;
    applying an entity extraction mechanism to identify seed entities related to the example content;
    generating a new interest group feed for the topic using the identified seed entities; and
    backfilling the new interest group feed with content identified based upon the identified seed entities.

2. The method of claim 1, wherein the interest group feed is arranged as a feed of posts, and wherein backfilling the interest group feed comprises adding a plurality of posts to the interest group feed that correspond to the selected content, wherein a first post of the plurality of posts is a private post and a second post of the plurality of posts is a public post.

3. The method of claim 1, wherein retrieving the content comprises locating at least some of the content via a keyword search based upon one or more keywords associated with the interest group feed.

4. The method of claim 1, wherein retrieving the content comprises performing a crawl for at least some of the content based upon a schedule or an event.

5. The method of claim 1, wherein retrieving the content comprises performing a general crawl for public data related to the interest group feed.

6. The method of claim 1, wherein retrieving the content comprises performing a directed crawl to look for newly added content in a predetermined set of one or more content locations.

7. The method of claim 1, wherein retrieving the content comprises performing a historical crawl for content related to a Uniform Resource Locator.

8. The method of claim 1, further comprising:
ranking at least some of the selected content based on one or more ranking criteria.

9. The method of claim 1, further comprising:
converting at least some of the selected content into a format that matches other interest group content associated with the interest group feed, the format being a post that is within the interest group feed.

10. The method of claim 1, wherein selecting at least some of the retrieved content comprises filtering, using the backfill mechanism, the retrieved content to one or more subsets based on one or more filtering criteria, wherein backfilling the interest group feed comprises conforming to one or more parameters including a size-related threshold level associated with a quantity of posts in the interest group feed.

11. The method of claim 1, wherein retrieving the content comprises performing a hierarchical crawl for a wider scope of content relative to a narrower set of interest group content.

12. The method of claim 1, further comprising:
extracting one or more keywords from the retrieved content; and
using the one or more extracted keywords to conduct a search for additional content.

13. The method of claim 1, further comprising:
identifying a change in sensitivity for first content of the selected content; and
based on the change in sensitivity, adjusting a first permission level of the one or more permission levels associated with the first content so that a first user has access to the first content and a second user does not have access to the first content.

14. A system comprising:
at least one processor; and
a memory, including code that executes as a crawling mechanism and as a backfill mechanism, the memory coupled to the at least one processor such that the at least one processor executes the code,
the crawling mechanism that searches for newly added content at one or more data sources and determines whether the newly added content has been previously presented at an interest group feed, and
on condition that the newly added content has not been previously presented at the interest group feed, the backfill mechanism:
retrieves the newly added content associated with the one or more data sources,
processes the retrieved content to select at least some of the content and associates the selected content with a permissioning scheme that controls access to the selected content, the permissioning scheme including one or more hierarchical permission levels;
backfills the interest group feed with at least some of the selected content based on a permission level of the permissioning scheme that corresponds to the permission level associated with the interest group feed;
receives example content associated with a topic that does not correspond to an existing interest group feed;
applies an entity extraction mechanism to identify seed entities related to the example content;
generates a new interest group feed for the topic using the identified seed entities; and
backfills the new interest group feed with content identified based upon the identified seed entities.

15. The system of claim 14, wherein the interest group feed includes a plurality of posts.

16. The system of claim 14, wherein the backfill mechanism is associated with a keyword extraction tool, the backfill mechanism using the keyword extraction tool to select the selected content via a keyword search using at least one keyword extracted from other interest group content of the interest group feed.

17. The system of claim 14, wherein the backfill mechanism is associated with a crawler, the backfill mechanism using the crawler to select the selected content based upon one or more crawling parameters.

18. One or more system memories having executable instructions, which upon execution by a processor coupled to the one or more system memories perform operations, comprising:
backfilling an interest group feed with additional content, in which the interest group feed includes content related to a topic of interest, including:
requesting at least one of: a keyword-based search, a general craw, a directed crawl, a historical crawl, or a hierarchical craw to identify selected content;
determining whether the selected content has been previously presented at the interest group feed;
on condition that the selected content has not been previously presented at the interest group feed, retrieving the selected content;
associating the selected content with a permissioning scheme that controls access to the selected content, the permissioning scheme including one or more hierarchical permission levels;
adding the additional content to the interest group feed, the additional content corresponding to at least some of the selected content associated with a permission level of the permissioning scheme that corresponds to the permission level associated with the interest group feed;
receiving example content associated with a topic that does not correspond to an existing interest group feed;
applying an entity extraction mechanism to identify seed entities related to the example content;
generating a new interest group feed for the topic using the identified seed entities; and
backfilling the new interest group feed with content identified based upon the identified seed entities.

19. The one or more system memories of claim 18 having further executable instructions comprising:
extracting one or more keywords from the retrieved content; and
using the one or more extracted keywords to conduct a search for additional content.

20. The one or more system memories of claim 18, wherein retrieving the selected content comprises performing a hierarchical crawl for a wider some of content relative to a narrower set of interest group content.

* * * * *